United States Patent
Liu

[19]

[11] Patent Number: 5,986,436
[45] Date of Patent: Nov. 16, 1999

[54] ELECTRIC POWER RECOVERING SYSTEM

[76] Inventor: Ping Yin Liu, P.O. Box 63-99, Taichung, Taiwan

[21] Appl. No.: 08/947,499

[22] Filed: Oct. 10, 1997

[51] Int. Cl.$^6$ .......................................................... H02J 7/00
[52] U.S. Cl. ........................................... 320/140; 320/135
[58] Field of Search ..................................... 320/135, 139, 320/140; 323/222

[56] References Cited

U.S. PATENT DOCUMENTS

| | | | |
|---|---|---|---|
| 3,909,747 | 9/1975 | Beierholm | 331/112 |
| 4,268,898 | 5/1981 | Brown | 363/20 |
| 5,594,320 | 1/1997 | Pcholok et al. | 320/103 |

OTHER PUBLICATIONS

Texas Instruments, "TLC555C, TLC555I, TLC555Y, LinCMOS Timers", SLFS043, pp. 1–12, Oct. 1993.

*Primary Examiner*—Peter S. Wong
*Assistant Examiner*—Gregory J. Toatley, Jr.

[57] ABSTRACT

An electric power recovering system includes a switch disposed between a battery and a coil, and two diodes coupled between the coil and the battery. A capacitor is coupled between the diodes and is grounded. The switch is alternatively actuated either manually or by an alternatively actuating device for allowing the coil to generate a high voltage and for allowing the coil to charge the battery. A DC/DC converter is further coupled between the battery and the switch for providing an increased electric power.

5 Claims, 4 Drawing Sheets

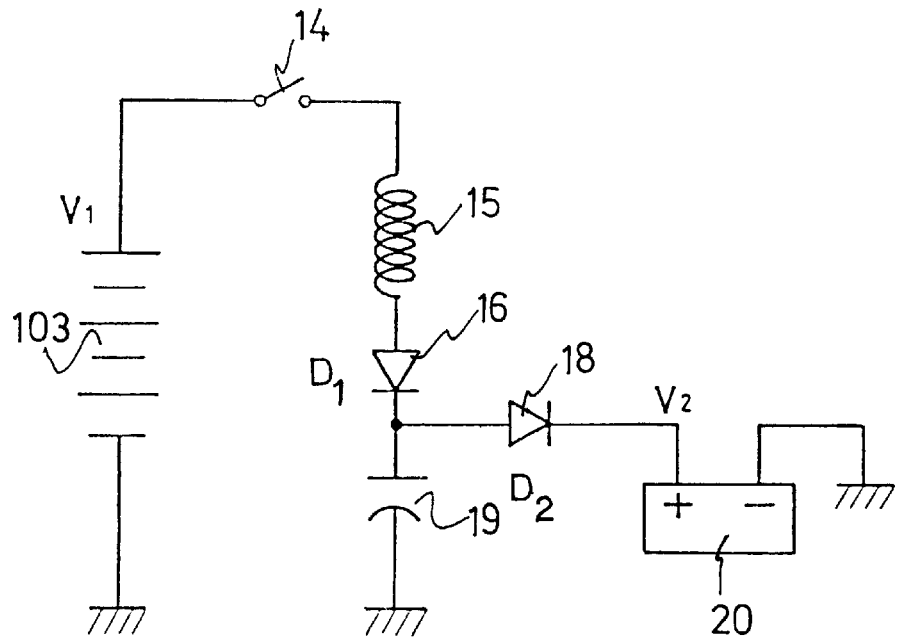
F I G. 3
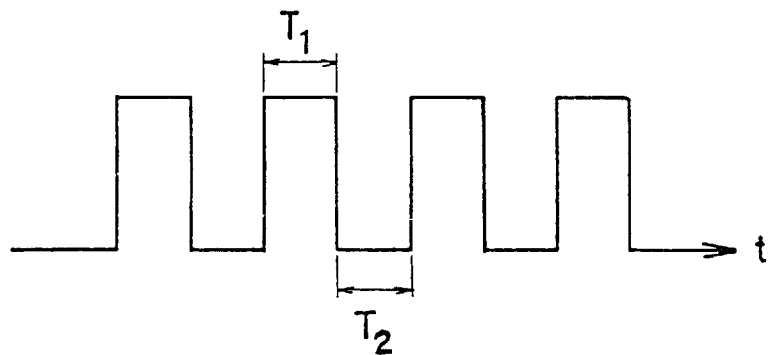
F I G. 6

ELECTRIC POWER RECOVERING SYSTEM

BACKGROUND OF THE INVENTION

1. Field of the Invention

The present invention relates to a recovering system, and more particularly to an electric power recovering system.

2. Description of the Prior Art

A typical electric circuit for an electric power device is disclosed in FIG. 8 and comprise a battery 90 having a voltage V, a coil 91 having an inductance L and having a voltage $V_L$, a resistor 92 or an electric appliance having a resistance R, and a switch 94 for coupling the resistor 92 to the battery 90 and for energizing the resistor 92. The voltage V equals to $V=IR+L(di/dt)$. The power equals to $P=IV=I^2R+LI(di/dt)$; in which $I^2R$ equals to the heat that will be generated by the resistor 92, and $LI(di/dt)$ equals to the energy in the coil 91. If U represents the energy stored in the coil 91, then $(dU/di)=LI(di/dt)$. $U=(½)LI^2$ which equals to the area of the shaded portion as shown in FIG. 7. As shown in FIG. 7, when the switch 94 is closed in order to energize the resistor 92, the voltage of the coil 91 $V_L$ drops quickly and initially and then smoothly after time $T_1$. The current of the coil 91 $I_L$ increases quickly and initially and then smoothly after time $T_1$. Accordingly, as shown in FIG. 7, only in time $T_1$ or only in the shaded area, the conversion of the energy stored in the coil 91 to power output may be excellently conducted. After $T_1$, di/dt almost equals to zero, such that the voltage V is almost applied to the equation $I^2R$ which means that the resistor 92 may generate a great heat after $T_1$. This means that almost all of the electric power is wasted for generating unwanted heat. The heat may also damage the electric power device.

The present invention has arisen to mitigate and/or obviate the afore-described disadvantages of the conventional electric power devices.

SUMMARY OF THE INVENTION

The primary objective of the present invention is to provide a recovering system for recovering the wasted electric power and for charging the electric power to the battery.

In accordance with one aspect of the invention, there is provided an electric power recovering system comprising a battery, a coil, a switch provided between the battery and the coil, and means for coupling the coil to the battery. The switch is alternatively actuated for allowing the coil to generate a high voltage and to charge the battery.

An actuating means is provided for alternatively actuating the switch and for closing the switch at a first time interval and for opening the switch at a second time interval, and for allowing the coil to charge the battery in the second time interval. The switch alternatively actuating means includes a metal oxide semiconductor field effect transistor (MOSFET) or an insulated gate bipolar transistor (IGBT) for actuating the switch alternatively.

The coupling means includes two diodes arranged in series and coupled between the coil and the battery, a capacitor coupled between the diodes for receiving an electric power and for allowing the capacitor to charge the battery with the received electric power. A DC/DC converter is further coupled between the battery and the switch.

Further objectives and advantages of the present invention will become apparent from a careful reading of a detailed description provided hereinbelow, with appropriate reference to accompanying drawings.

BRIEF DESCRIPTION OF THE DRAWINGS

FIGS. 2, 3, 4 and 5 are electric circuits illustrating the applications of the electric power recovering system;

FIG. 6 shows a square wave for actuating the switch;

DETAILED DESCRIPTION OF THE PREFERRED EMBODIMENT

Figure 2:
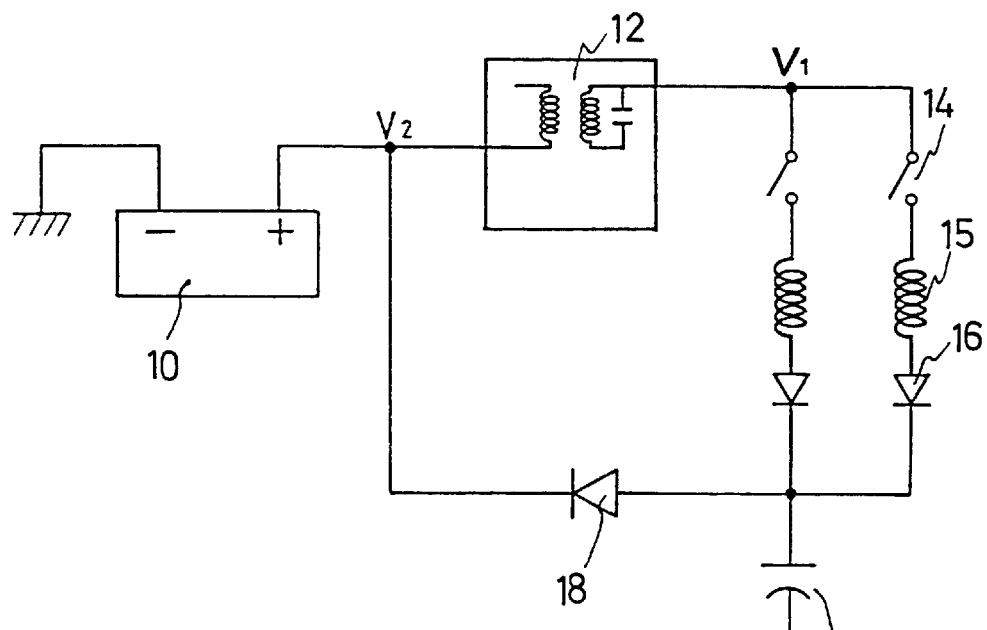
Figure 1:
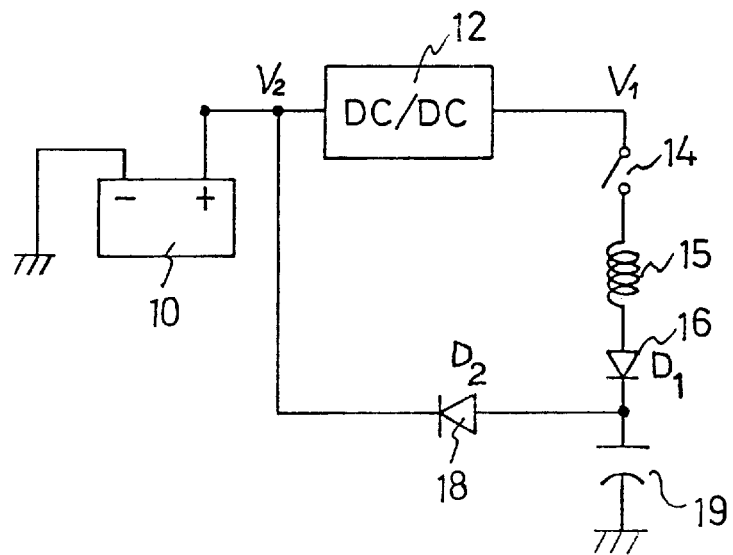
FIG. 1 is an electric circuit illustrating an electric power recovering system in accordance with the present invention.

Referring to the drawings, and initially to FIG. 1, an electric power recovering system in accordance with the present invention comprises a battery 10, a DC/DC (direct current/direct current) conversion circuit 12, one set of switch 14 and coil 15 and diode 16 arranged in series, another diode 18 coupling the diode 16 to the battery 10, and a capacitor 19 coupled to the diodes 16, 18 and grounded. As shown in FIG. 2, two sets of switches 14, coils 15, and diodes 16 may be arranged in parallel and coupled to the capacitor 19 in series. The DC/DC conversion circuit 12 may increase the voltage from $V_2$ to $V_1$ for providing a greater and stabilized electric power to energize the coil 15 and the diodes 16, 18.

As shown in FIG. 6, when the switch 14 is actuated alternatively with time intervals $T_1$ and $T_2$, in which the switch 14 is closed in time interval $T_1$ and is opened in time interval $T_2$, an electromotive force (emf) will be generated and equals to emf $V=-L(di/dt)$. The energy will be received by the diode 16 and will be sent back and charged into the battery 10 by the capacitor 19 via the other diode 18. For example, when the battery 10 includes a 12V voltage, the 12V voltage may be increased to more than 30V by the DC/DC converter 12 such that the higher voltage $V_1$ may be used for energizing the coil 15 and the diodes 16, 18. It is to be noted that the coil 15 energized by the higher voltage $V_1$ will not generate heat because the coil 15 is energized only in the time interval $T_1$ and is off in the time interval $T_2$.

The electric power may be charged back into the battery 10 directly from the diode 16 without the capacitor 19 and the diode 18 if the electric conversion of the emf equals to the greatest charging allowability of the battery 10 or if the electric power supplied to the coil 15 is greater than that required for actuating the coil 15. The maximum current $I_{max}$ will be $I_{max}=(V_1-V_2-V_{D1}-V_{D2})/Z_L$. The greater the $V_1-V_2$, the greater the di/dt. Accordingly, within time interval $T_1$, the heat generated is the lowest and the power is the greatest such that the energy recovering effect is the best within time interval $T_1$; i.e., the electric power may be greatly charged back to the battery 10. The energy stored U in the coil 15 will be $U=(½)LI^2$ and will be greatly increased. The voltage $V_1$ will also be greatly increased. It is to be noted that the time interval $T_2$ is preferably equals to the time interval for allowing the emf to charging the electric power to the battery 10.

In physics, the work W equals to force times the distance of the object moved; i.e., $W=Fd$. The distance $d=V_0t+(½)at^2=(½)at^2$. This means that time interval is the most important factor for the work that may be done by the object. This also means that the greater the force, the greater the work. The greatly increasing of the voltage $V_1$ may greatly increase the force F applied to the object and may thus greatly increase the work done to the object.

Figure 4:
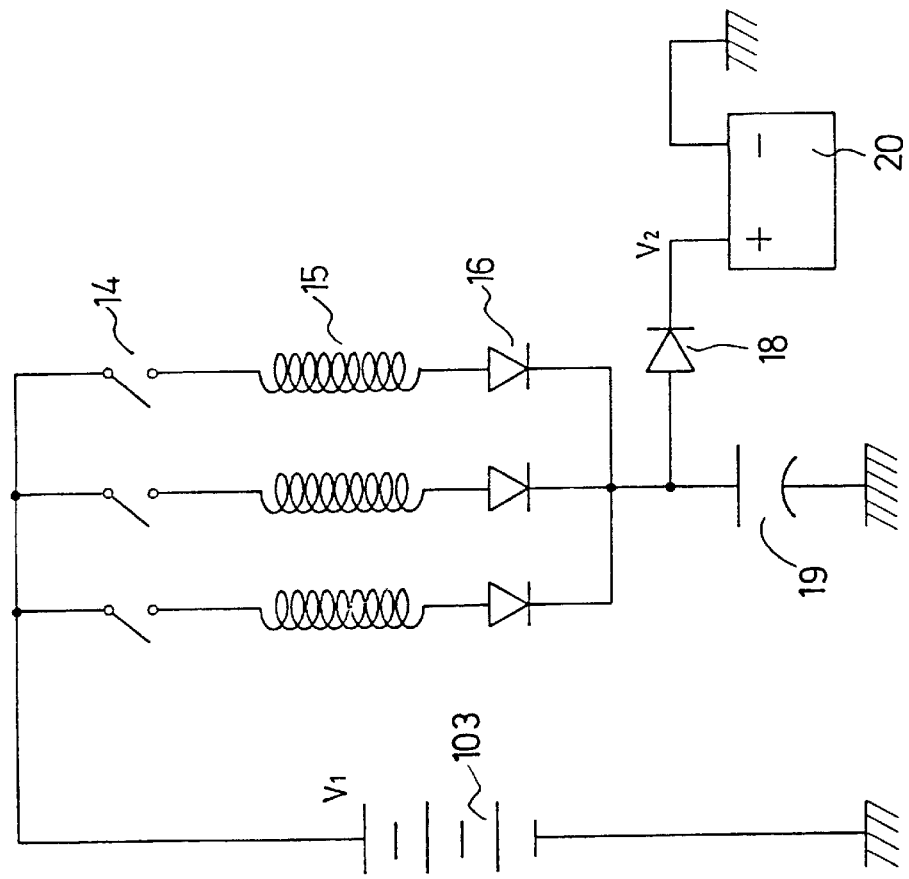
Figure 7:
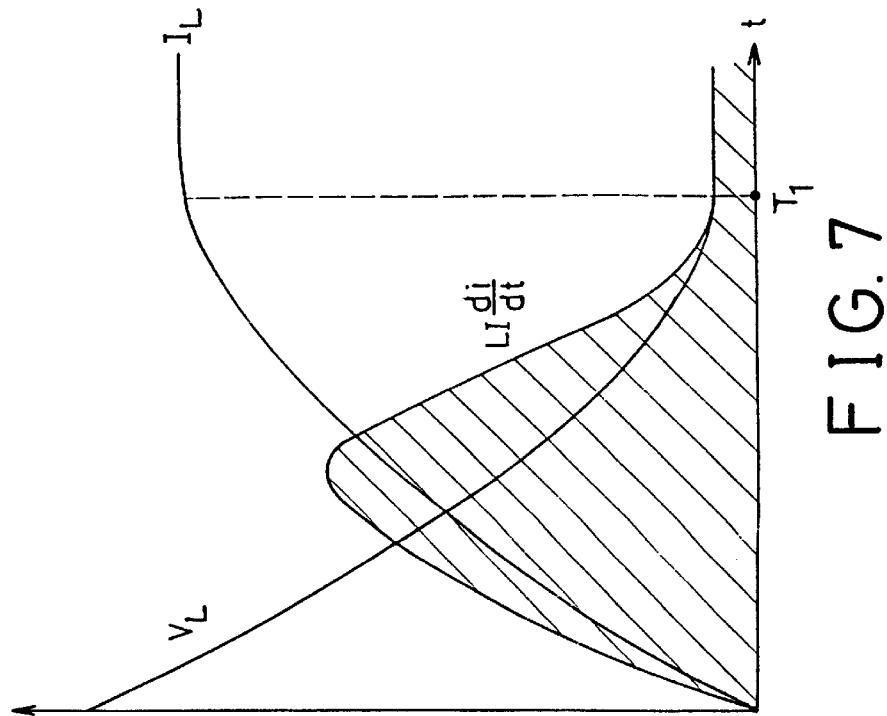
FIG. 7 is a chart for illustrating the voltage and the current of a coil relative to time.

Referring next to FIG. 3, a further battery 20 may be provided and coupled to the diode 18 for allowing the capacitor 19 to charge the battery 20 with the received electric power via the diode 18. An electric power reservoir 103, such as an 110 or 120 V AC(alternating current) power supply 103 may be coupled to the coil 15 via the switch 14. The 110V or 120V voltage is far greater than that required for actuating the coil 15. However, the coil 15 will not generate the unwanted heat because the switch 14 is operated alternatively with time intervals $T_1$ and $T_2$, as described above. Referring next to FIG. 4, three or more sets of switches 14 and coils 15 and diodes 16 may be arranged in parallel and coupled to the capacitor 19 in series.

Figure 5:
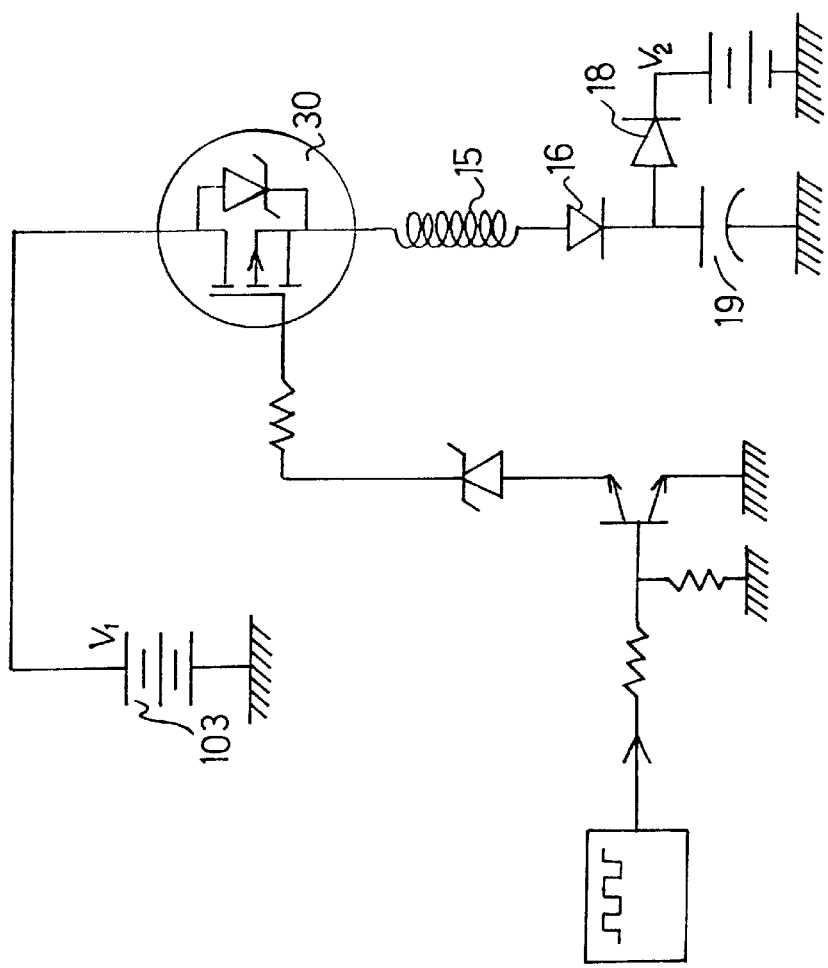
Figure 8:
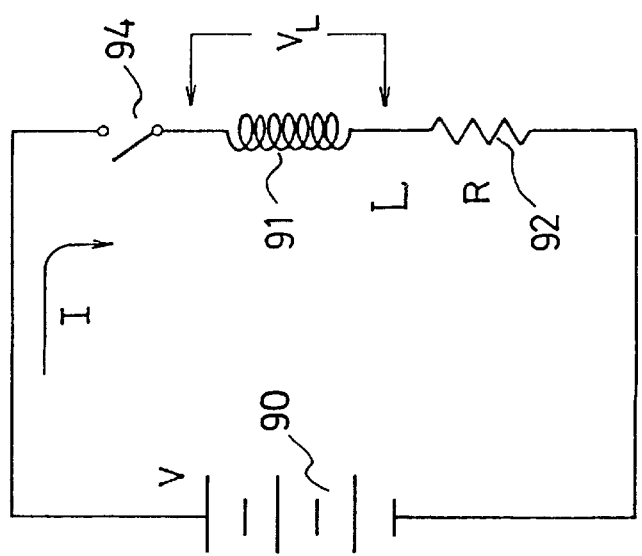
FIG. 8 is an electric circuit illustrating a typical electric power device.

An electromagnetic device or a metal oxide semiconductor field effect transistor (MOSFET) (FIG. 5), such as the model IRFP 9240 made by Harris co. may also be used for actuating the switch 14 in an alternative way. An insulated gate bipolar transistor (IGBT) may also be used for actuating the switch 14 in an alternative way. The switch 14 may also be alternatively actuated manually.

For all of the typical electric appliances, such as motors, air conditioners, electric fans, etc., the electric power has not been effectively used and is mostly wasted. The electric power recovering system in accordance with the present invention may effectively recover and charge the electric power, that may be wasted, back to the battery for further use. The continuously charged battery may also be used for energizing the electric power engine for vehicles. It is further to be noted that the DC/DC converter may increase the voltage to energize the coil 15, and the system may charge the battery 10 for allowing the battery 10 to maintain more than 90% electric power at all time. This may prevent the battery from being easily damaged.

Accordingly, the electric power recovering system may recover and charge the electric power that may be wasted to the battery for further use.

Although this invention has been described with a certain degree of particularity, it is to be understood that the present disclosure has been made by way of example only and that numerous changes in the detailed construction and the combination and arrangement of parts may be resorted to without departing from the spirit and scope of the invention as hereinafter claimed.

I claim:

1. An electric power recovering system comprising:

a battery, a coil, a switch provided between said battery and said coil, means for coupling said coil to said battery, and a DC/DC converter coupled between said battery and said switch for increasing a voltage of said battery and for supplying a greater voltage to said switch, said switch being alternatively actuated for allowing said coil to generate a high voltage and for allowing said coil to charge said battery.

2. The electric power recovering system according to claim 1 further comprising means for alternatively actuating said switch and for closing said switch at a first time interval and for opening said switch at a second time interval, and for allowing said coil to charge said battery in said second time interval.

3. The electric power recovering system according to claim 2, wherein said switch alternatively actuating means includes a metal oxide semiconductor field effect transistor (MOSFET) for actuating said switch alternatively.

4. The electric power recovering system according to claim 1, wherein said coupling means includes a first diode and a second diode arranged in series and coupled between said coil and said battery, and a capacitor coupled between said first diode and said second diode for receiving an electric power and for allowing said capacitor to charge said battery with the received electric power.

5. An electric power recovering system comprising:

a battery, a coil, a switch provided between said battery and said coil, and means for coupling said coil to said battery, said coupling means including a first diode and a second diode arranged in series and coupled between said coil and said battery, and a capacitor coupled between said first diode and said second diode for receiving an electric power and for allowing said capacitor to charge said battery with the received electric power, said switch being alternatively actuated for allowing said coil to generate a high voltage and for allowing said coil to charge said battery.

* * * * *